United States Patent Office 3,193,349
Patented July 6, 1965

3,193,349
METHOD OF PRODUCING BOEHMITE OF 50 TO 80 A. CRYSTAL SIZE
John Mooi, Homewood, Ill., assignor to Sinclair Research, Inc., Wilmington, Del., a corporation of Delaware
No Drawing. Filed Apr. 13, 1962, Ser. No. 187,189
6 Claims. (Cl. 23—143)

The present invention relates to a method for the production of crystalline boehmite which is useful for supporting catalytically-active metal components to provide a variety of catalysts.

Alumina hydrate as it is first precipitated from aqueous solutions of aluminum salts by the addition of basic solutions is usually amorphous. When it is washed and dried it shows no diffraction pattern with X-rays. Under some circumstances an X-ray diffraction pattern of boehmite is found with this kind of material but the pattern is such that it indicates the crystal size of the bohemite to be less than 50 A. and the content of the boehmite usually less than 70%. This material forms an adequate catalyst support for some purposes and is used extensively.

The quality of the catalyst support can be improved a great deal if the support precursor is composed of crystal sizes of at least 50 A. This effect comes about through an improvement in the porosity of macrosize catalyst particles made from these crystals. In general, it has been found that an increase in the boehmite crystal size results in an increase in the catalyst pore radius. This increase in pore size results in greater diffusion rates for reactants and products into and out of the catalyst particles, and often this results in improved catalyst activity. The extent to which boehmite crystal size can be increased with advantage, however, is limited. As the crystal size is increased there is a decrease in surface areas. Since the reactions take place on the catalyst surface, it is clear that surface area should not be too severely reduced. Thus, certain compromises must be made in the creation of a support for a catalyst since obtaining the maximum of one feature often results in the minimum as to some other feature.

It has now been discovered that boehmite crystals in an average size range of from 50 to 85 A. can be prepared by the simultaneous addition at essentially atmospheric pressure of an aqueous solution of aluminum chloride and an aqueous basic solution of ammonia, ammonium carbonate or a mixture thereof to water maintained at a temperature of about 150 to 215° F., preferably about 175° to 215° F. When necessary the resultant mixture is refluxed to obtain a product predominating in boehmite crystals of 50 to 85 A. size. This product after incorporation of a promoter, extruding to macrosize particles and calcining forms a catalyst which is strong, highly porous, i.e., having pore volume of about 0.70 to 0.90 cc./gram, has a substantial amount of its pore volume in pores of large size, i.e., about 0.35 to 0.45 cc. in pores of about 50 to 150 A., and retains a high surface area, usually of about 200 to 350 m.²/gram.

The aqueous aluminum chloride solution of the present invention contains generally about 0.2 to 6 molar, preferably about 0.5 to 2 molar, concentration of aluminum chloride. The concentration of ammonia or ammonium carbonate aqueous solution employed is generally about 0.2 to 15 normal, preferably about 1.5 to 6 normal. When an ammonia-ammonium carbonate combination is employed the molar ratio of ammonia to ammonium carbonate is often about 0.5:1 to 20:1. To obtain the optimum surface area and porosity characteristics it is important that the solutions not be too dilute or too concentrated. The former condition results in a less than desirable surface area and the latter condition in a less than desirable pore size. Preferably the concentration of the reagent should be selected so that the ammonia, ammonium carbonate or their mixture is present in excess, for instance, about 10 to 30% over that required to precipitate all of the aluminum as $Al(OH)_3$. Changes in concentration can be compensated for somewhat by changes in addition time.

The addition rate of the reagents is with advantage relatively slow and the time may constitute say about 15 minutes to 12 hours, preferably about ½ to 3 hours. Usually the rate of addition and the heat input to the water-containing vessel is such that the contents of the vessel stay near the boiling point (at atmospheric pressure) during the additions. Use of higher temperature is possible, however, if pressure equipment is utilized. Advantageously, the mixture is stirred rapidly during the addition.

When it is necessary or desirable to reflux the reflux time after the simultaneous addition is sufficient to give crystals of desired size and will usually not require more than about 10 days, most often about 0.5 to 5 days, depending on the percentage of boehmite it is desired to have in the product and on the pH of the slurry during precipitation of the alumina hydrate. Precipitation at a low pH appears to slow the rate at which boehmite crystals grow thereby requiring longer refluxing times. If very high excesses of ammonia or ammonium carbonate are used so that the pH of precipitation is high, e.g., greater than 7.5 preferably at least 7.8 to 9, a product of the desired crystallite size can be obtained without the reflux. On the other hand, pH values higher than 7.5 are difficult to obtain at boiling without a great loss in ammonia. Thus, although a pH at precipitation generally of about 3.5 to 9.0 can be employed, it is preferred to use a pH of about 5 to 7.5.

As an incident to the alumina hydrate formation, extraneous contaminating ions such as chloride ions may be introduced. These ions can be materially removed by washing the alumina hydrate with water, for instance, to reduce the chloride ion concentration in the precipitated portion to less than about 0.2% on a dry basis. Dilute ammonium carbonate solution can be used advantageously during washing to lower the chloride content since it provides for a significantly faster rate of chloride removal than when only water is used for washing.

The alumina produced by this invention is particularly effective for use as a catalyst component or catalyst support in any suitable reaction system and can be advantageously employed in hydrocarbon conversion reactions carried out at elevated temperatures in the presence of added free hydrogen such as, for instance, reforming, hydrocracking, and the like. Thus, the alumina may be impregnated or otherwise composited with catalytically active, materials such as metals or metal compounds particularly those from Group VIA and Group VIII of the Periodic Table.

These catalytic materials include, by way of example, compounds of chromium, molybdenum, tungsten, iron, nickel, cobalt, the platinum group metals, such as platinum, palladium, ruthenium, rhodium and iridium, or mixtures of two or more such compounds.

The amount of metal or metal oxide composited with the alumina will depend on a particular metal involved as well as on the intended use of the resulting composite. With metals of the platinum group, the amount of metal composited with the alumina will generally be within the approximate range of 0.01 to 2% by weight of the final composite. With metals of the iron group, usually larger amounts will be employed generally between about 0.1% to about 20% by weight of the final composite. With two or more metal or metal oxides, the total metal composited with the alumina will generally be within the approximate range of 1% to 30% by weight of the final composite. Thus, with a composite of alumina, molybdenum oxide and cobalt oxide, the final composition will generally contain from about 5% to about 15% by weight of molybdenum oxide and from about 0.5% to about 5% by weight of cobalt oxide and the remainder alumina.

Thus, platinum is an effective metal component to be combined with the alumina since composites of platinum and the alumina produced according to the invention have been found to be very active, particularly when the composite so prepared is to be employed in the reforming or petroleum naphtha fractions.

When making a catalyst the hydrous alumina can be impregnated using conventional procedures including direct impregnation with a suitable catalytic promoting solution without undergoing previous extensive filtering, washing, drying and calcining operations. The hydrous alumina is normally filtered and washed for purification, one or more catalytic promoting constituents incorporated either before or after filtration or other concentration, or before or after drying, and subsequently calcined before or after formation of macrosized particles by tabletting or extrusion. The macrosized particles can be formed before or after drying or calcination of the boehmite. The impregnation may also take place before or after calcining the alumina to the activated or gamma-alumina form.

In the preferred embodiment the aqueous slurry of washed hydrous alumina produced may be impregnated directly with the catalytic promoting material, particularly when the solids are diluted sufficiently to allow good stirring. With platinum, a preferred method of introduction is to contact the slurry of washed hydrous alumina produced with a solution of chloroplatinic acid while stirring, and to thereafter add an aqueous solution of hydrogen sulfide or otherwise introduce a suitable reagent to yield sulfide ion through the slurry with continued stirring, forming platinum sulfide. Another suitable method for introducing platinum into the hydrous alumina slurry is to form a separate aqueous solution of chloroplatinic acid and to introduce hydrogen sulfide gas into the solution until the chloroplatinic acid has formed a finely subdivided precipitate, which will occur as sulfide ion becomes available. Thus, chloroplatinic acid solution is normally light yellow and upon addition of hydrogen sulfide gas turns to a dark brown color. The brown suspension may then be combined with the slurry of hydrous alumina. While platinum is preferably combined with the alumina as a solution of chloroplatinic acid, other suitable platinum solutions or suspensions may be employed. In certain instances it may be desirable to use other than water only as a medium for adding the component to the alumina. In addition to platinum, other metals of the platinum family such as palladium may be combined with the alumina in a similar manner using, for example, palladium chloride as the impregnating soltuion.

The hydrous alumina produced in accordance with this invention is also effective as a support, carrier, or component for catalytic bodies including nickel and tungsten sulfides, as well as for carrying chromium or molybdenum. These latter metals may be deposited on the hydrous alumina before or after drying by contact thereof with suitable solutions of chromium or molybdenum-containing compounds. In similar fashion, the hydrous alumina produced in accordance with the present process may be impregnated with nickel, iron, molybdenum, tungsten, cobalt or oxides of these metals. A particularly effective catalytic composite comprises alumina, molybdenum oxide and cobalt oxide. Another effective catalytic composite comprises alumina, molybdenum oxide and oxides of nickel and iron. See U.S. Patent No. 2,781,295.

In preparing such composites, any suitable soluble salt of the metal of the iron group may be employed. For cobalt, a particularly preferred salt is cobalt sulfate, although other soluble salts may be employed including cobalt nitrate and cobalt chloride. Soluble salts of nickel, suitable for use as impregnating solutions include tetraaminenickel (II) nitrate, nickelous nitrate, nickelous sulfate, nickel bromide, nickel fluosilicate, nickel chloride, and nickel iodide. Soluble iron salts include ferric nitrate, ferric chloride and ferrous sulfate. When compositing two or more metal compounds with the alumina, an impregnating solution comprising the two or more metal compounds may be employed as an impregnating solution or alternatively, the alumina may be initially composited with an impregnating solution of one metal compound, thereafter dried and/or calcined and then composited with a solution of the second metal compound. After impregnation, the resulting impregnated product is dried generally at a temperature within the range of about 170° F. to 400° F. for at least about six hours and up to about twenty-four hours or more with a stream of air circulated to carry off the water vapor. The alumina catalyst mixture then may be formed into macrosize particles by a tabletting or extruding operation. The macrosized particles can be formed, however, before or after drying, calcination or impregnation. If the catalyst is to be in finely divided form, a grinding operation may follow drying or calcination. In the case of tabletting it is customary to incorporate a die lubricant which adavntageously is organic and can be burned out by oxidation in the calcination step. By "macrosized" is meant particles of about $\frac{1}{16}$ to $\frac{1}{2}$ inch in width or diameter and about $\frac{1}{16}$ to 1 inch or more in length, commonly about $\frac{1}{16}$ to $\frac{1}{2}$ inch in length.

The pellets or finely divided particles are suitable for subjection to high temperature treatment or calcination at a temperature between about 500° F. and about 1400° F., usually about 700° F. and 1000° F., for a period at least sufficient to provide activated or gamma-alumina. Often calcination may take between about two and about thirty-six hours. It is sometimes preferred that the calcining operation be conducted to minimize contact time of the alumina-containing product with water vapor at the high temperatures encountered. The product after drying generally contains a substantial amount of water, for example, from about 15 to 30% of water including that chemically combined, which is driven off at temperatures above 500° F. It is usually preferred to heat the alumina-containing composite at a rate of about 2 to 20° F. per minute up to about 600° F. with an air flow through the catalyst bed followed by heating at a slower rate to the final calcination temperature within the range of about 500° F. to 1400° F. especially if an organic die lubricant is to be oxidized without localized overheating. While the calcination or heat treatment will generally be conducted in air, it is also feasible to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen followed by heat treatment in an atmosphere of air or hydrogen. The alumina impregnated with one or more catalytically active materials is cooled to yield the finished product.

In general, the boehmite supports of the present invention containing catalytic amounts of a platinum group noble metal, e.g., platinum, can be used to reform under the usual conditions of reforming for instance, to reform light hydrocarbon stocks to produce gasoline, benzene and other selected aromatics. The hydrocarbon stock to be reformed is contacted with the catalyst in a reaction zone at an elevated temperature generally within the range of about 750° to about 1000° F. under a total pressure generally of about 200 to about 1000 p.s.i.g. and a hydrogen partial pressure approximating from about 3 to about 20 moles of hydrogen per mole of hydrocarbon charge stock. The catalyst is conveniently handled in the form of pellets or tablets which are placed in the reaction zone in the form of a fixed bed, although, in finely divided form, the catalyst may be handled in a fluidized reaction system. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and to provide for reheating between stages. The reactor effluent is passed through a liquid-gas separating system from which the fixed gases which usually approximate upwards of about 70% hydrogen are recovered for recycle. The liquid products then are fractionated in the usual way for recovery of a stabilized gasoline reformate or for recovery of the selected aromatic hydrocarbons.

The following example will serve to illustrate the present invention.

EXAMPLE

A 2 molar $AlCl_3$ solution and a basic solution of either ammonia, ammonium carbonate or a mixture of the two were added simultaneously from burets into 750 ml. of boiling deionized water. During the addition the pH was maintained at either 5, 6, 7.5 or 8.5 by regulating the rate of addition. The addition time for the runs was between 50–70 minutes except for run 1070–71 in which the the addition was completed in 27 minutes.

After the addition was complete, a portion of the slurry was removed, filtered and washed with ammonium carbonate solution. The remainder was refluxed for 120 hours after which it also was filtered and washed with ammonium carbonate. The washed filter cakes were oven-dried and analyzed. The results are shown in Table I below.

The X-ray diffraction technique employed to determine the boehmite crystallite size is as follows: With the equipment as is used for determining percentage boehmite except that a receiving slit of 0.003 inch is used, the X-ray diffraction patterns are obtained by scanning at ⅛ degree per minute using the Brown strip chart recorder running at ⅛ inch per minute. The crystallite size L, in angstrom (A.) units is an estimate obtained from the width of one of the diffraction peaks, using the Scherrer equation in the form $$L = \frac{\lambda}{B \cos \tfrac{1}{2}\theta}$$

Here B is the width of the line at half maximum measured in radians, $\lambda$ is the wave length of the X-rays used in angstrom units (1.54), and $\theta$ is the spectrometer angle at which the peak occurs (38°). For this work the equation simplifies to $$L = \frac{93}{W\tfrac{1}{2}}$$

Where W½ is the width of the line at half maximum intensity, expressed in degrees of spectrometer angle. The number of crystallites per gram of alumina (N) can be derived from the crystallite size (L), the percent boehmite (P) and the density of boehmite (3.07) using the formula:

$$N = \frac{P \times 10^{22}}{L^3 \times 3.07}$$

I claim:

1. A method of producing crystaline boehmite having a crystal size of 50 to 85 A. which comprises simultaneously adding to water maintained at a temperature of about 150 to 215° F. aqueous aluminum chloride solu-

*Table I*

| Run 1070- | 71 II | 79 I | 79 II | 82 I | 75 I | 70 I |
|---|---|---|---|---|---|---|
| Base used | $NH_3$ | $(NH_4)_2CO_3 \cdot NH_4HCO_3$ | $3NH_3 + (NH_4)_2CO_3$ | $3NH_3 + (NH_4)_2CO_3$ | $(NH_4)_2CO_3 \cdot NH_4HCO_3$ | $NH_3$ |
| Normality of base | 6 | 3 | 3 | 3 | 3 | 6 |
| pH of precipitation | 5 | 6 | 6 | 6 | 7.5 | 8.5 |
| pH of slurry (before aging) | 5.1 | 6.1 | 6.35 | 8.9 | 7.6 | 8.7 |
| Before aging: Spl. No. 410- | 1343 | 1024 | 1029 | 1046 | 1358 | 1324 |
| Percent V.M. (1,000° C.) | 26.2 | 22.1 | 25.9 | 20.89 | 21.50 | 20.5 |
| Percent Cl | 0.08 | 0.12 | <0.05 | 0.05 | <0.05 | 0.10 |
| Percent Boehmite X.R.D | amorphous | 53 | 66 | 62 | 67 | 77 |
| Boehmite size, A | | 37 | 43 | 45 | 45 | 53 |
| Cryst./g.×10⁻¹⁵ | | 340 | 270 | 220 | 250 | 155 |
| After refluxing: Spl. No. 410- | 1352 | 1037 | 1034 | 1049 | 1013 | 1340 |
| Percent V.M. (1,000° C.) | 21.94 | 21.37 | 20.8 | 20.37 | 18.53 | 20.1 |
| Percent Cl | 0.10 | 0.05 | 0.06 | <0.05 | | 0.06 |
| Percent Boehmite X.R.D | 68 | 75 | 77 | 72 | 84 | 76 |
| Boehmite size, A | 51 | 53 | 50 | 55 | 85 | 73 |
| Cryst./g.×10⁻¹⁵ | 166 | 164 | 200 | 140 | 45 | 64 |

The data shows that the method of the present invention is able to produce substantial boehmite crystallites in the 50 to 85 A. size range. Run 1070–70I in the data also shows that the employment of a high pH of precipitation in the method of the present invention effects the desired results without a refluxing step.

The percentage and size of the crystalline boehmite in this example is determined by X-ray diffraction.

The X-ray diffraction technique employed to determine percentage of boehmite is as follows: Using the commercial Norelco X-ray diffractometer with a copper target X-ray tube, nickel foil filter, standard slits of size 1 degree for the diverence slit and 0.006 inch for the receiving slit, the X-ray diffraction patterns are obtained by scanning at 1 degree per minute using the Brown strip chart recorder running at ½ inch per minute. The area under the 14 degree boehmite diffraction peak is measured by a planimeter and compared with the area under the 14 degree diffraction peak of a reference sample run the same day by the same technique. The reference sample is believed to contain 39.5 percent boehmite and 60.5 percent of other alumina hydrates.

tion having a molar concentration of about 0.2 to 6 and an aqueous basic solution selected from the group consisting of ammonia, ammonium carbonate and mixtures thereof, said basic solution having a concentration of about 0.2 to 15 normal, maintaining said temperature during the addition and refluxing the resultant mixture to obtain crystalline boehmite having an average crystal size of 50 to 85 A.

2. The method of claim 1 wherein the concentration of the aluminum chloride solution is about 0.5 to 2 molar and the concentration of the basic solution is about 1.5 to 6 normal.

3. The method of claim 2 wherein a temperature of about 175 to 215° F. is maintained during the addition.

4. The method of claim 3 wherein the pH during addition is maintained at about 5.0 to 7.5 and the addition time is about ½ to 3 hours.

5. A method of producing crystalline boehmite having a crystal size of 50 to 85 A. which comprises simultaneously adding to water maintained at a temperature of about 150 to 215° F., an aqueous aluminum chloride solution having a molar concentration of about 0.2 to 6 and an aqueous basic solution selected from the group consisting of ammonia, ammonium carbonate and mixtures thereof, said basic solution having a concentration of about 0.2 to 15 normal, maintaining said temperature during said addition and maintaining the pH of the resulting slurry during addition at above 7.5 to 9 to obtain boehmite crystals having an average crystal size of 50 to 85 A.

6. A method of producing crystalline boehmite having a crystal size of 50 to 85 A. which comprises simultaneously adding to water maintained at a temperature of about 175 to 215° F., an aqueous aluminum chloride solution having a molar concentration of about 0.5 to 2 and an aqueous basic solution selected from the group consisting of ammonia, ammonium carbonate and mixtures thereof, said basic solution having a concentration of about 1.5 to 6 normal, maintaining said temperature during said addition and maintaining the pH of the resulting slurry during addition at above 7.8 to 9 to obtain boehmite crystals having an average crystal size of 50 to 85 A.

References Cited by the Examiner
UNITED STATES PATENTS

| 2,137,638 | 11/38 | Sondern et al. | 23—143 |
| 2,667,404 | 1/54 | Haensel | 23—141 X |
| 2,867,588 | 1/59 | Keith et al. | 23—143 |

FOREIGN PATENTS 644,781  10/50  Great Britain.

MAURICE A. BRINDISI, *Primary Examiner.*